(12) United States Patent
Parker (10) Patent No.: US 6,369,793 B1
(45) Date of Patent: Apr. 9, 2002

(54) PRINTED DISPLAY AND BATTERY

(75) Inventor: Robert Parker, Palm Desert, CA (US)

(73) Assignee: David C. Zimman, Fairfax, CA (US)

( * ) Notice: Subject to any disclaimer, the term of this patent is extended or adjusted under 35 U.S.C. 154(b) by 0 days.

(21) Appl. No.: 09/281,332

(22) Filed: Mar. 30, 1999

Related U.S. Application Data
(60) Provisional application No. 60/079,828, filed on Mar. 30, 1998.

(51) Int. Cl.$^7$ .............................. G09G 3/34; H01M 6/30
(52) U.S. Cl. ......................... 345/107; 429/110; 429/124
(58) Field of Search ................................ 345/105, 106, 345/107; 429/152, 110–119, 8, 90, 191, 192, 124, 127

(56) References Cited

U.S. PATENT DOCUMENTS

| | | | |
|---|---|---|---|
| 4,527,096 A | | 7/1985 | Kindlmann |
| 4,554,565 A | | 11/1985 | Kito et al. |
| 4,637,148 A | * | 1/1987 | Barlow .......................... 40/1.5 |
| 4,665,342 A | | 5/1987 | Topp et al. |
| 5,055,968 A | * | 10/1991 | Nishi et al. .................. 361/737 |
| 5,413,739 A | | 5/1995 | Coleman |
| 5,460,902 A | * | 10/1995 | Parker et al. ................. 429/90 |
| 5,495,250 A | * | 2/1996 | Ghaem et al. ................ 342/51 |
| 5,500,759 A | | 3/1996 | Coleman |
| 5,557,208 A | | 9/1996 | Parker |
| 5,709,962 A | * | 1/1998 | Bailey .......................... 429/93 |
| 5,825,174 A | | 10/1998 | Parker |
| 5,872,552 A | | 2/1999 | Gordon, II et al. |
| 6,019,284 A | * | 2/2000 | Freeman et al. ............. 235/380 |
| 6,118,426 A | * | 9/2000 | Albert et al. ................ 345/107 |
| 6,124,851 A | * | 9/2000 | Jacobson .................... 345/206 |
| 6,136,468 A | * | 10/2000 | Mitchel, Jr. et al. ......... 429/110 |

FOREIGN PATENT DOCUMENTS
WO    WO-98/22987 A2 * 5/1998

OTHER PUBLICATIONS

Science News Online: Rethinking Ink Printing the pages of an electronic book, by Ivars Peterson, Jun. 20, 1998, reprinted form the Internet address: http://ww.sciencenews-.org/sn_arc98/6_20_98/bob2.htm dated Mar. 17, 1999, 6 pages.

E–Ink Corporation, E Ink Company Info reprinted for the Internet address: http://www.electronic–ink.com/aboutus.html dated Mar. 17, 1999, 1 page.

MIT Media Laboratory Projects, *Micromedia*—Joseph Jacobson reprinted from the Internet address: http://www-.medi.mit.edu/Projects/jacobson.html dated Mar. 17, 1999, 1 page.

Electronic Paper, *Electronic Paper Books and Electronic Books* by Dr. Joseph M. Jacobson, Barrett Comiskey, Patrick Anderson and Leila Hasan reprinted from the Internet address: http:www.media.mit.edu/micromedia/elecpaper.html dated Mar.17, 1999, 2 pages.

* cited by examiner

*Primary Examiner*—Richard Hjerpe
*Assistant Examiner*—Alexander Eisen
(74) *Attorney, Agent, or Firm*—Renner, Otto, Boisselle & Sklar, LLP (57) ABSTRACT

A display system includes a printed display formed on a substrate and a printed battery in electrical communication with the printed display. The printed display provides power to the printed display. Since both the display and battery are printed, the resulting display system is extremely thin and the manufacture thereof is reliable and inexpensive. The display system contemplates various types of printed displays such as an electrochromic display, a thermochromic display, an electroluminescent display, or an electrophoretic display.

45 Claims, 7 Drawing Sheets

PRINTED DISPLAY AND BATTERY

This Application claims the benefit of U.S. Provisional Application Ser. No. 60/079,828 filed Mar. 30, 1998.

FIELD OF THE INVENTION

The present invention generally relates to displays and more particularly relates to a display system including a printed display and a printed battery integrated together onto a single substrate.

BACKGROUND OF THE INVENTION

In many applications, such as magazines, advertising, toys, greeting cards, CD jackets, etc, it is desirable to have a low cost, semi-disposable electronic display that can be activated to provide a dynamic motion, figures or games. A number of display technologies can be printed, such as electrochromic displays (e.g., Monsanto Corporation's inter-digitated concept), thermochromic (i.e., "heat activated") displays and electroluminescent displays, etc. Printing displays can provide a low cost, flat, simple method for production, however, a limiting factor for using these displays is the cost, attachment, storage (shelf life), shipping and handling of batteries used for powering such displays.

Presently, commercial batteries used for these applications tend to be bulky and expensive. For example, coin cell type batteries used in some of these applications can be one-eighth of an inch (1/8") or more thick. In addition, the electrical attachment to a display only 0.005 or 0.010 inch thick requires mechanical borders and spring contacts, as well as mounting and hand labor for large batteries. Further, as these devices increase in complexity, they become less reliable. Therefore there is a need in the art for a display system that overcome the shortcomings of the prior art.

SUMMARY OF THE INVENTION

The present invention relates to a display system having a printed display integrated with a printed battery to provide an extremely thin, portable display system that may be used in numerous, diverse applications, for example, greeting cards, advertisements, bumper stickers, toys, commercial labels, stamps, etc.

The display system of the present invention overcomes the size limitations of the prior art (primarily the thickness) by integrating a printed display with a printed battery. The printing of both components results in a very thin display system (e.g., about 0.005 to about 0.010 inches) which greatly expands the number of applications for such a display system. In addition, because both components are printed, both components may be integrated onto the same substrate, thus further reducing the size of the display system. The printing of both components also allows printed conductors to interconnect the components which substantially improves the reliability of the connections while reducing the cost of manufacture.

The printing system of the present invention may employ any one of various printed displays. For example, the display may include a printed electrochromic display, a printed thermochromic display, a printed electroluminescent display or a printed electronic ink display, among others. The printed battery may be directly coupled to the printed display or alternatively may be selectably coupled thereto via a switch. The switch may be a touch-type switch which forms a short circuit in response to an external force applied thereto; alternatively, the switch may be an electrically controllable switch, for example, a thin film transistor which serves to activate the printed display in conjunction with a programmable control sequence. Consequently, the display system may form a single pixel or display portion in a larger display environment and, in conjunction with a plurality of such pixels or display portions, may provide a dynamic display capable of generating multiple images.

The printed battery of the present invention is preferably formed in two, separate printed stacks to allow for storage of the display system in a non-activated state. The printed stacks are preferably formed on a single, flexible substrate having a spaced apart anode layer and cathode layer formed thereon. A printed electrolyte layer is formed on either the anode layer or the cathode layer with a release liner formed thereon. Because the anode layer and the cathode layer, when separated, are not in ionically conductive contact with one another through the electrolyte layer, no battery leakage occurs and the printed battery advantageously has a virtually infinite storage life. The printed battery may be activated by removing the release liner and coupling the anode and cathode layers together via the electrolyte layer, preferably by folding the flexible substrate, as has been developed by Wisconsin Label.

The display system of the present invention may be formed by printing with both the printed display and the printed battery formed adjacent to one another on a common substrate with printed conductors formed thereon to establish electrical communication therebetween. It was discovered that many, but not all of the printing materials and printing steps were similar for the printed battery and the display. Alternatively, the printed display and the printed battery may be integrated vertically with the printed display formed on top of the printed battery, thus further reducing the size of the display system. In addition, the printed display and printed battery may be formed in a vertical relationship on opposite sides of a common substrate with the anode layer and cathode layer spaced apart from one another to allow the printed battery to be maintained in a non-activated state. By folding the substrate, the printed battery is activated and forms a vertically coupled printed display system. It was also discovered that one could print touch panel or activation switches at the same time one could print the battery and the display.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The following is a detailed description of the present invention made in conjunction with the attached Figures, wherein like reference numerals will refer to like elements throughout. The present invention relates to a printed display system which incorporates a printed display and a printed battery therein which may be coupled together directly or through printed activation switches. With both components printed the resulting display system is extremely thin, the components may be integrated together onto a common substrate and manufactured with a common printing process, thereby improving the interconnection reliability of the display system and substantially reducing the cost of manufacture. Due to the integrated nature of the display system, the printed display may provide the full display functionality or may alternatively operate as an individual pixel or display portion within a larger display environment. Therefore the printed display of the present invention may operate individually or with other printed display elements to provide static or dynamic images, as may be desired.

Figure 1A:
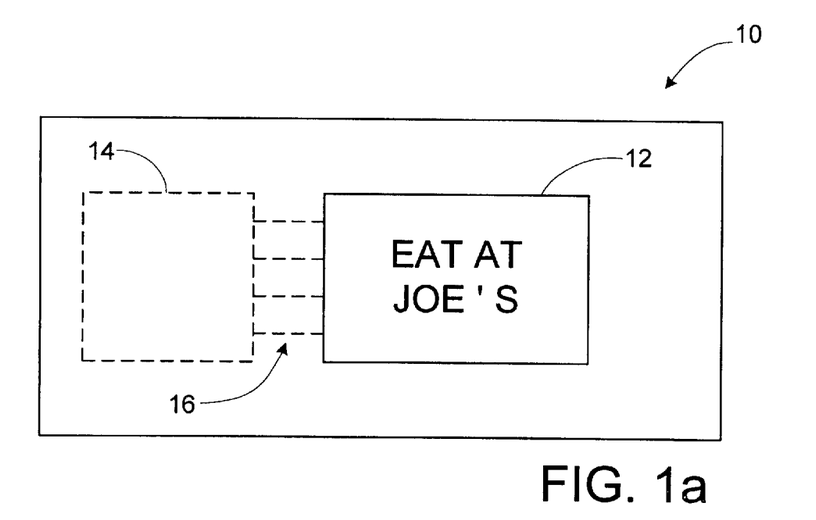
FIGS. 1a and 1b are a plan view and a cross section view illustrating a thin display system having a printed battery and a printed display according to the present invention.

Turning now to the Figures, FIG. 1a is a plan view of a display system 10 according to an exemplary embodiment of the present invention. The display system 10 includes a printed display 12 and a printed battery 14 in electrical communication with one another, preferably via conductors 16. The printed display 12 may be an one or more of various types of printed displays, for example, an electrochromic display, a thermochromic display, an electroluminescent display or an electronic ink display. Other types of displays may also be used and such alternative displays are contemplated as falling within the scope of the present invention. As illustrated in FIG. 1a, the printed display 12 may provide a complete image such as the message "EAT AT JOE'S." Alternatively, the display 12 may include an image (e.g., a colored image), as will be described in greater detail infra. Further, although the display system 10 of FIG. 1a is illustrated as a complete display system, the printed display 12 may alternatively be a portion of a larger display image or even may consist of a single image pixel, as may be desired.

The printed battery 14 supplies a DC-type voltage potential to the printed display 12 via the conductors 16 (which preferably are also printed) to power the display 12. The printed battery 14 preferably provides a DC voltage of about 1.0 volts, however, the voltage value may vary depending upon the electro-potential of the anode and cathode materials which are used. Further, the voltage may be increased by printing multiple batteries in series, as may be desired.

Figure 1B:
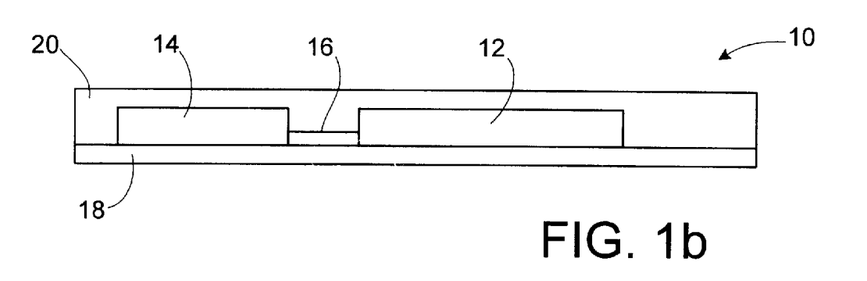

A cross section diagram illustrating the display system 10 of FIG. 1a is illustrated in FIG. 1b. In FIG. 1b, the printed display 12, the printed battery 14 and the printed conductors 16 are formed by printing on a substrate 18. Any conventional printing or painting process may be employed and are contemplated as falling within the scope of the present invention, for example, thick film printing (i.e., silk screening). The substrate 18 preferably is a flexible substrate, for example, a polyester film having a thickness of about 0.003–0.010" (about 3–10 mils). Alternatively, however, other substrate materials such as polycarbonate or paper may be used and are contemplated as falling within the scope of the present invention. The display system 10 preferably includes a transparent protective film 20 which overlies the various components 12, 14 and 16 for protection from the external environment. According to an exemplary embodiment of the present invention, the transparent protective film 20 is polyester, although other suitable materials may be used and are contemplated as falling within the scope of the present invention, for example, polycarbonate.

Figure 2:
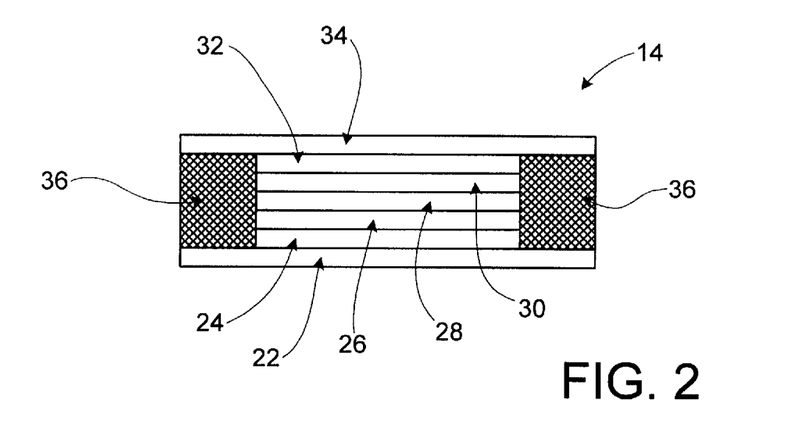
FIG. 2 is a cross section diagram illustrating a printed battery according to an exemplary embodiment of the present invention.

A cross section diagram illustrating the printed battery 14 according to an exemplary embodiment of the present invention is shown in FIG. 2. A substrate 22, preferably a substrate which is common to the printed display 12, such as the above-described polyester film substrate 18 has a contact layer 24 of conductive ink printed thereon, which serves as a current collector for the battery 14. Preferably, the contact layer 24 is composed of a carbon or a carbon/silver ink and is printed, however, other conductive type inks or other similar materials may be used and are contemplated as falling within the scope of the present invention, for example, deposited and etch thin conductive films.

An anode layer 26 is formed by printing on the contact layer 24. Preferably, the anode layer 26 consists of an ink carrier having $MnO_2$ particulates therein having a solids content of about 20% to about 60% or more. An electrolyte layer 28 is then formed by printing over the anode layer 26. The electrolyte layer is composed of an electrolyte such as a polymeric gel or a salt loaded gel such as that used in EKGs, for example, and preferably is deposited by printing in the form of an adhesive gel such as a hydrogel, as will be described in greater detail infra.

A cathode layer 30 is formed by printing over the electrolyte layer 28. Preferably, the cathode layer 30 is an ink carrier having zinc particulates therein having a solids content of about 20% to about 60% or more. Above the cathode layer 30 is another contact layer 32 which acts as a current collector for the printed battery 14. Similar to the first contact layer 24, the second contact layer 32 is preferably a conductive ink such as a carbon or carbon/silver ink (e.g., having a resistivity of about 0.33 Ω/square to about 30 Ω/square), however, other printed conductor material may also be employed and are contemplated as falling within the scope of the present invention.

A protective film 34 is formed over the second contact layer 32 and preferably is a polyester film, such as the exemplary substrate 22. In fact, the protective film 34 and the substrate 22 may be the same structure, as will be discussed below in conjunction with FIG. 3. According to a preferred embodiment of the present invention, a pair of printed dielectric sidewalls 36 are formed adjacent to the stack of layers 24, 26, 28 and 30, respectively. The dielectric sidewalls 36 prevent ionic conduction from occurring elsewhere other than through the electrolyte layer 28 and also maintains the integrity of the electrolyte layer 28 by preventing the electrolyte layer 28, which preferably has a gel-like consistency, from escaping from between the anode and cathode layers 26 and 30, respectively. The resultant battery 14 is extremely thin, wherein each of the layers discussed above exhibit a dry thickness of about 0.0002" to about 0.0008", respectively.

The printed battery 14 operates in the following manner. The anode layer 26 is the positive battery electrode and preferably consists of manganese dioxide (i.e., $MnO_2$ particulates in the ink carrier) and the cathode layer 30 is the negative battery electrode and preferably consists of zinc (i.e., zinc particulates in the ink carrier). Alternatively, other anode and cathode materials may be used as is well known by those skilled in the art. The electrolyte layer 28 is an ionically conductive material such as a mixture of ammonium chloride and zinc chloride. Chemical reactions which occur at the anode and cathode electrodes 26 and 30 convert chemical energy into electrical energy by pumping electrons from one electrode (the anode 26) to the other (the cathode 30). The above phenomena causes a voltage potential to develop across the anode layer 26 and the cathode layer 30 which serves as the voltage supplied by the printed battery 14. The pumping of electrons also provides for the supply of current to the printed display, as may be appreciated.

The printed battery 14 of FIG. 2 is illustrated in an activated state; that is, the anode layer 26 and the cathode layer 30 are coupled together via the electrolyte layer 28 and electrons can travel from the anode 26 to the cathode 30 even when the printed battery 14 is not electrically connected to a device for supplying power (e.g., in storage before use). The chemical reaction in the activated state, despite the printed battery 14 not being in use, causes the printed battery 14 to slowly lose charge, thereby detrimentally impacting the ability of the printed battery 14 to maintain an acceptable storage life. The printed battery 14 of the present invention, however, may be printed in a non-activated state, for example, as illustrated in FIG. 3, which advantageously provides for a virtually infinite battery storage life.

Figure 3:
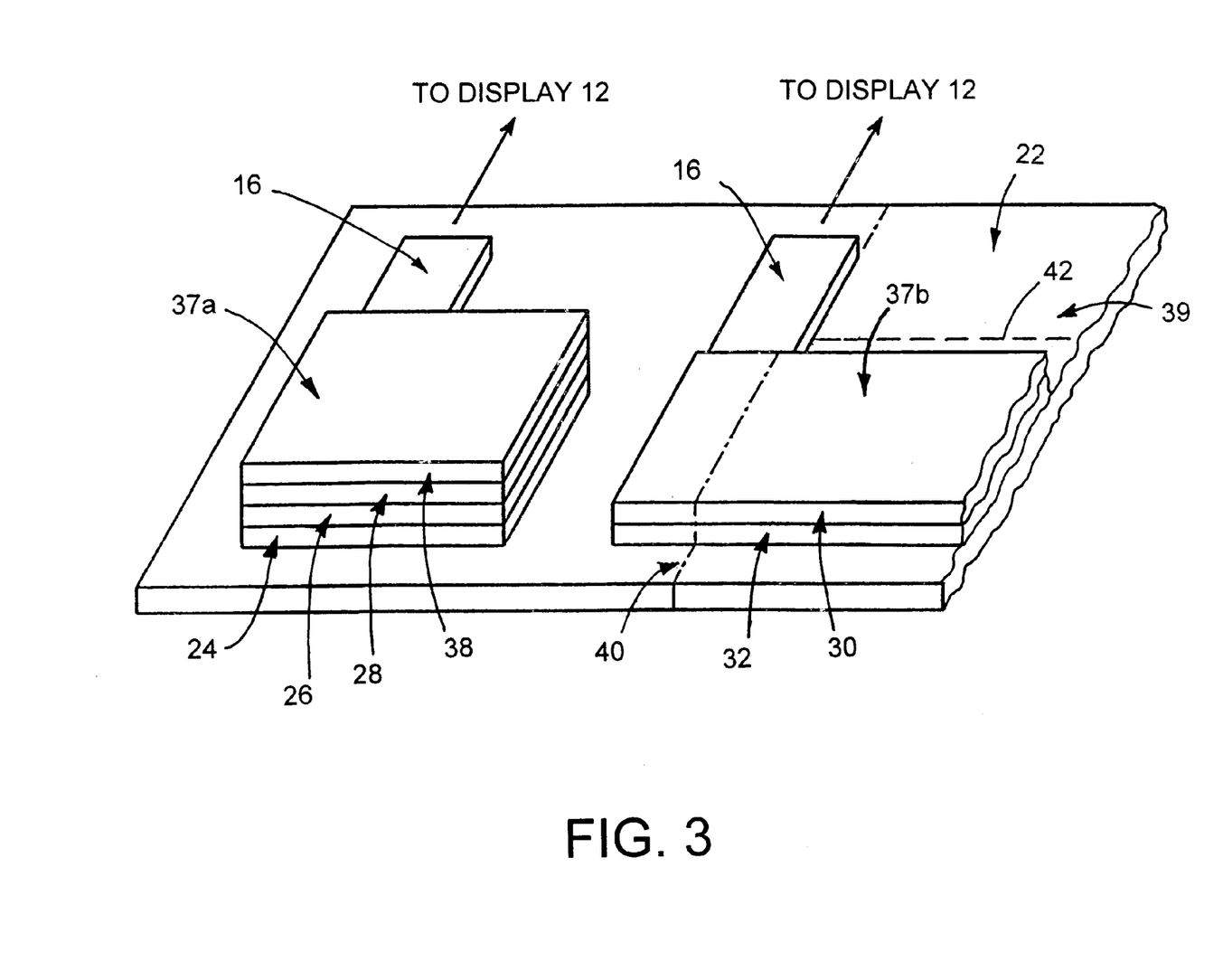
FIG. 3 is a perspective view illustrating a printed battery in a non-activated state according to the present invention.

FIG. 3 is a perspective view illustrating the printed battery 14 of the present invention in a non-activated state. That is, the printed battery 14 is configured in such a manner that the anode and cathode layers 26 and 30 are not coupled together via the electrolyte layer 28. This non-activated state is achieved by forming the anode layer 26 and the cathode layer 30 in separate stacks 37a and 37b which are spaced apart from one another on the substrate 22. Because the anode layer 26 and the cathode layer 30 are physically separated as illustrated, no chemical reaction will occur therebetween and thus no charge will "bleed" off of the electrodes. Consequently, the storage life of the printed battery 14 in the non-activated state is virtually infinite in duration.

In the non-activated state, a release liner 38 is formed over the electrolyte layer 28, as shown in FIG. 3, which prohibits the electrolyte from degrading while in storage. When it is time to place the printed battery of FIG. 3 into the activated state, such as that illustrated in FIG. 2, the release liner 38 is removed and the flexible substrate 22 is folded over, preferably at the fold line 40 so that the cathode layer 30 is brought into contact with the exposed electrolyte layer 28. Preferably, the electrolyte layer 28 is composed of a gel-like material having an adhesive consistency, which provides for the anode layer 26 and the cathode layer 30 to be fixedly coupled together via the electrolyte layer 28.

Note that the dielectric sidewalls 36 of FIG. 2 are not shown in FIG. 3 for the sake of simplicity. Such sidewall spacers 36 may be fabricated via printing for the printed battery 14 in the non-activated state and such an embodiment is contemplated as falling within the scope of the present invention. In addition, in FIG. 3, due to the location of the fold line 40, it may not appear that by folding the substrate 22 that the second stack 37b will properly overlie the first stack 37a. Please note, however, for purposes of illustration, a right portion 39 of the substrate 22 and the second stack 37b are fragmented and the stack 37b extends further in the fragmented direction so that, upon folding, the second stack 37b (the layers 30, 32 and the associated portion of the substrate 22) will overlie properly the first stack 37a.

In FIG. 3, the electrolyte layer 28 is formed by printing on the first stack 37a. Alternatively, the electrolyte 28 may be formed on the cathode layer 30 on the second stack 37b with the release liner 38 formed thereon. The location of the fold line 40 is chosen as illustrated in FIG. 3 to advantageously allow the printed conductors 16 associated with both stacks 37a and 37b to remain spaced apart from one another and thus avoid the potential of shorting. Alternatively, the fold line may be located at other locations, for example, between the stacks 37a and 37b, however, additional insulating precautions may be advisable to ensure that the conductors 16 associated with the anode 26 and the cathode 30 remain electrically isolated from one another.

In addition, to prevent the folding of the substrate 22 from impacting the viewability of the printed display (which is preferably formed on the same substrate 22, the substrate 22 may be severed along a dotted line 42 so that the folding will not impact the viewability of the printed display 12. In another alternative embodiment, the shape of the substrate 22 may be such that the folding of a portion of the substrate 22 will not impact the viewability of the display 12. For example, the substrate 22 may be "L-shaped", wherein a bottom portion of the "L" is dedicated to the folding of the substrate 22 to alter the printed battery 14 from the non-activated state to the activated state. Furthermore, as illustrated in FIG. 3, the conductors 16 may be integrated with the first and second contact layers 24 and 32, respectively, so that they are printed during the same printing step. Consequently, the interconnection between the conductors 16 and the printed battery 14 are of high quality (e.g., having a low resistivity) and exhibit high reliability.

Figure 4:
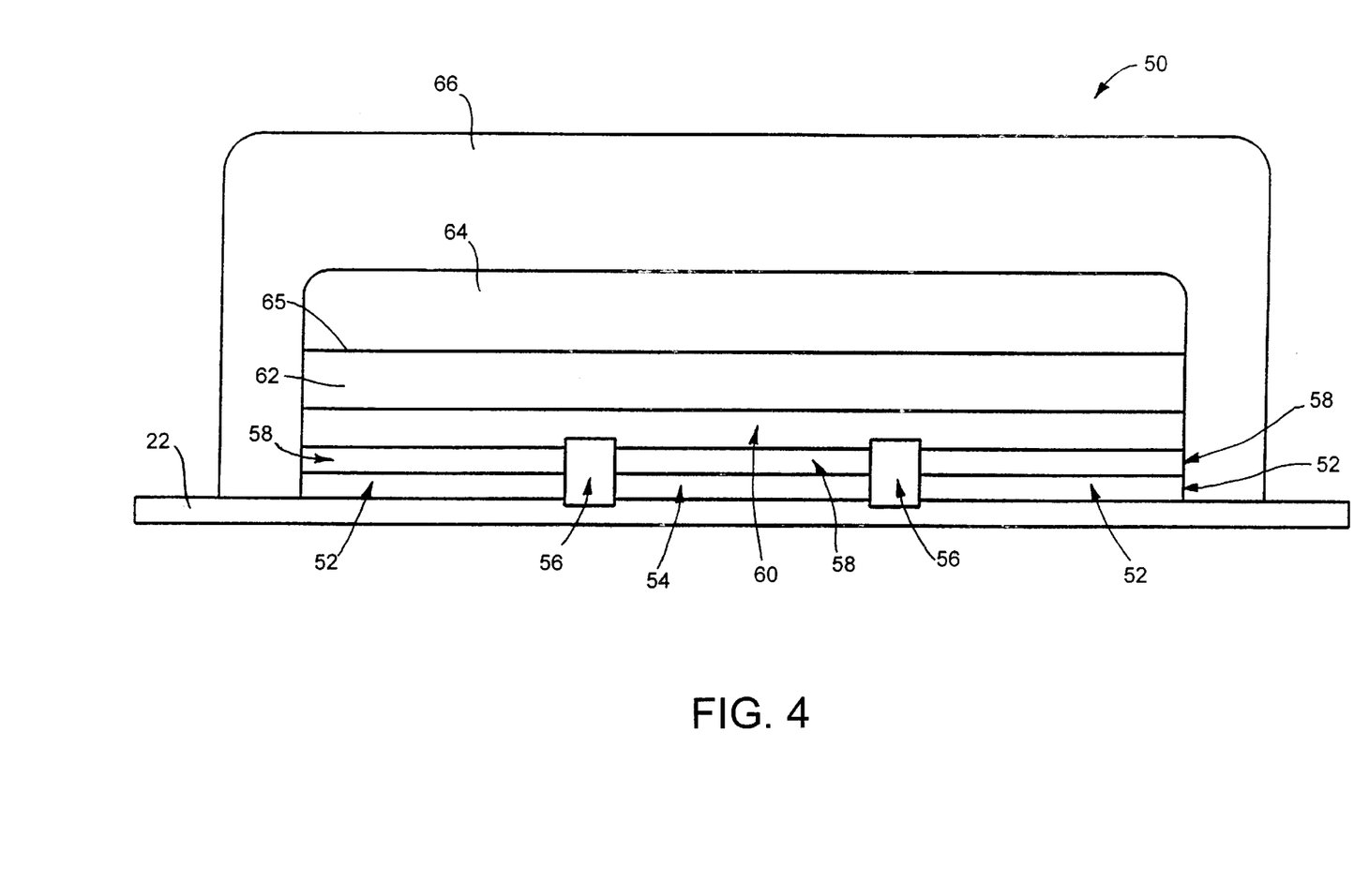
FIG. 4 is a cross section diagram illustrating a printed electrochromic display according to an exemplary embodiment of the present invention.

As discussed supra, the printed display 12 of the present invention may be any one of various types of printed displays. FIG. 4 is a cross section of a printed electrochromic display 50 according to an exemplary embodiment of the present invention. The electrochromic display 50 is formed on a substrate, preferably the same substrate 22 upon which the printed battery 14 is formed. A pair of interdigitated electrodes 52 and 54 are formed on the substrate 22, preferably with dielectric spacers 56 (e.g., a UV crosslinked epoxy) formed therebetween to maintain the electrodes 52 and 54 electrically isolated from one another. Alternatively, the electrodes 52 and 54 may simply be printed in such a manner to have sufficient spacing therebetween to maintain the desired electrical isolation.

Figure 5:
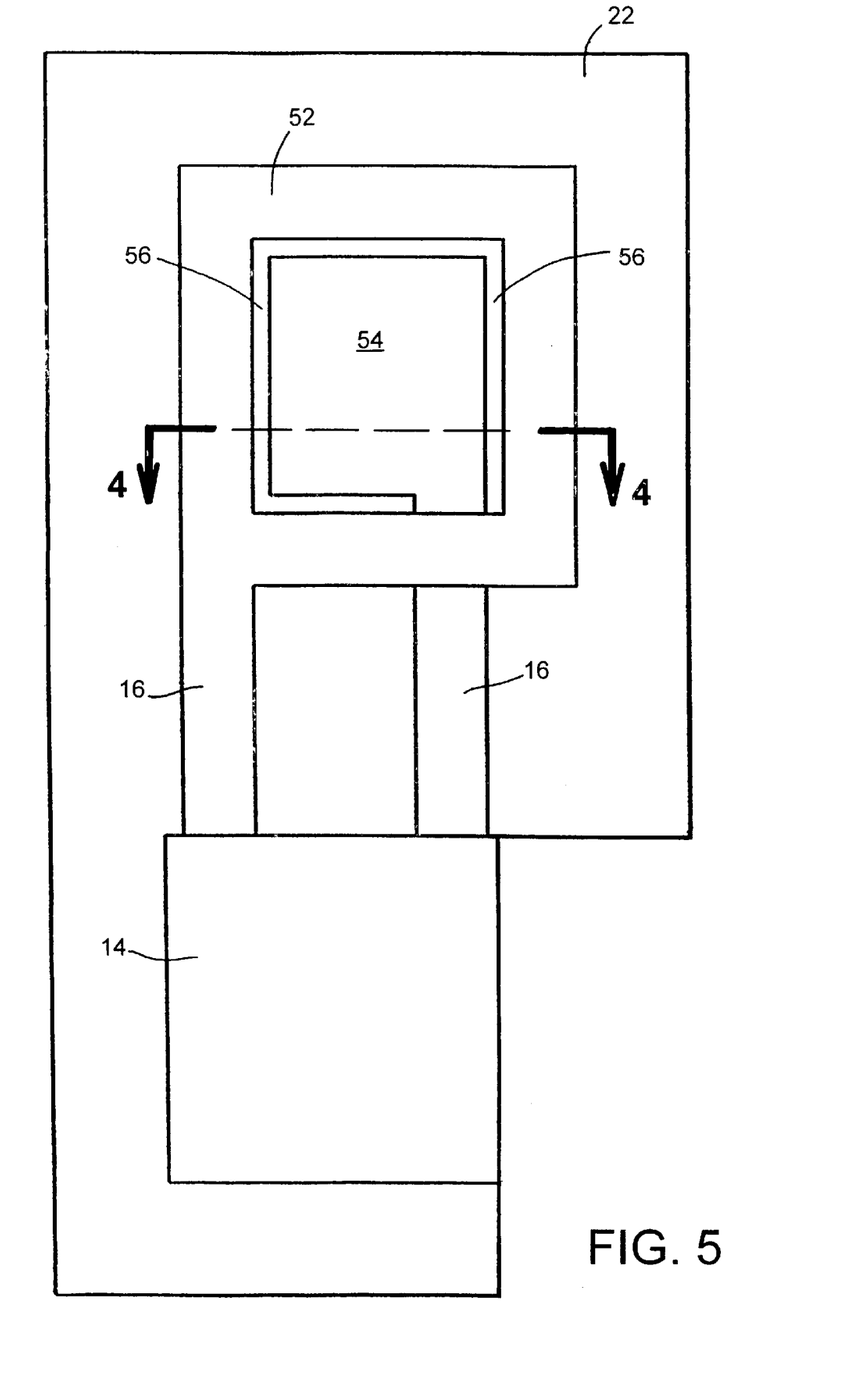
FIG. 5 is a plan view illustrating the printed battery coupled to the interdigitated electrodes of a printed electrochromic display according to the present invention.

The electrodes 52 and 54 are "interdigitated" in the sense that the first or "outer" electrode 52 encircles or otherwise surrounds the second or "inner" electrode 54, as illustrated in the exemplary plan view of FIG. 5. The electrodes 52 and 54 are connected to or integral with the conductors 16 to thereby establish electrical communication with the printed battery 14. Therefore the interdigitated electrodes 52 and 54 will have a voltage potential applied thereto having a voltage magnitude dictated by the printed battery 14. Preferably, the electrodes 52 and 54 are formed by printing with a carbon/ silver ink, although other materials may be used and are contemplated as falling within the scope of the present invention.

Referring again to FIG. 4, a passivation layer 58 is formed over the electrodes 52 and 54, respectively. Preferably, the passivation layer 58 is composed of a carbon ink, although other materials may be used and are contemplated as falling within the scope of the present invention. Such materials may be obtained, for example, from Acheson Ink or DuPont, respectively. The passivation layer 58 prevents overlying materials (which will be discussed in greater detail below) from diffusing therethrough and adversely affecting the electrodes. For example, the overlying materials are electrochromic and the conductive electrodes 52 and 54 are electrochromically active which can cause the electrodes 52 and 54 to oxidize if contact therebetween occurs. To the extent that such contact will not occur, the passivation layer 58 is optional. A conductive metal oxide dispersion layer 60 is formed by printing over the passivation layer 58. The layer 60 is used primarily in interdigitated type electrochromic displays and acts to provide a sufficient lateral resistance to force current vertically therethrough to thus channel the current up and through the overlying layers to achieve the electrochromic effect, as will be described in greater detail below. According to an exemplary embodiment of the present invention, the layer 60 includes a polymer, a polymerizable monomer or an oligomer having electrically conductive particles dispersed therein. Although the layer 60 is electrically conductive (e.g., about 20 $\Omega$/square to about 100 $\Omega$/square), it is also essentially ionically insulative.

An electrochromic layer 62 is formed by printing and overlies the layer 60. As is well known by those skilled in the art, an electrochromic material is a material which changes color when subjected to an electrochemical potential. The electrochromic layer 62 may include, for example, polyaniline, polypyrrole, polythiophene, nickel oxide, tungsten oxide, iridium oxide, as well as other materials. Any printable electrochromic material may be used and each such material is contemplated as falling within the scope of the present invention.

A printed electrolyte layer 64, preferably a gel, is formed over the electrochromic layer 62. According to an exemplary embodiment of the present invention, the electrolyte layer 64 is an aqueous polymeric gel which may contain a humectant or hygroscopic filler such as lithium chloride, calcium chloride or other similar materials. One exemplary electrolyte material is polyacrylamidomethylpropanesulfonate (POLYAMPS), although any suitable electrolyte material may be used and is contemplated as falling within the scope of the present invention. Lastly, a transparent protective film 66, for example, polyester is formed by printing over the electrolyte layer 64 and serves to protect the display 50 from the external environment.

The display 50 operates generally as follows. When a voltage potential is applied across the electrodes 52 and 54, the interface 65 between the electrolyte layer 64 and the electrochromic layer 62 is electrochromically activated. In such a case, the path of least electrical resistance is from one of the electrodes 52 or 54, up through the electrochromic layer 62 and through the electrolyte layer 64, and back down through the electrochromic layer 62 to the other one of the electrodes 54 or 52. The electrochromic effect is then observable at the interface 65 between the electrochromic layer 64 and the electrochromic layer 62. A transfer of electrons to electrochromic particles within the electrochromic layer 62 requires ion transfer to or from the electrochromic layer 62. Since the underlying layer 60 is essentially ionically insulative, the ion transfer must occur at the interface 65. A change in the oxidation state of the electrochromic material results in a change of color in the material at the interface 65. Consequently, by manipulating the location and pattern of the electrodes (e.g., having multiple such electrochromic displays with a common or dedicated printed battery), a plurality of images can be generated by the electrochromic effect. Additional details concerning an electrochromic display may be found in U.S. Pat. No. 5,413,739, which is hereby incorporated by reference in its entirety.

Figure 6A:
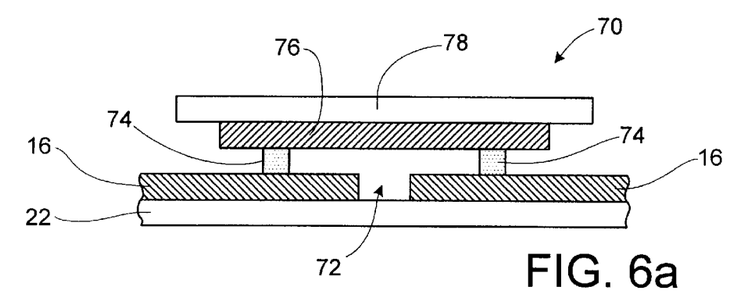
FIGS. 6a and 6b are cross section views illustrating a touch-type printed switch in an open circuit and a short circuit configuration, respectively.
Figure 6B:
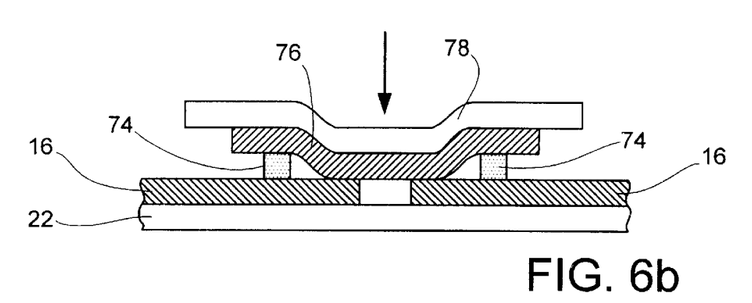

As illustrated in FIG. 5, the printed battery 14 may be directly connected to the printed display 12 via the conductors 16, such that when the printed battery 14 is in the activated state, the printed display 12 will always have a DC voltage applied thereto. According to an alternative embodiment of the present invention, one or more selectively activatable switches may be interposed between the display 12 and the battery 14 along the conductors 16. Preferably, the switches are printed switches such as a touch switch 70 illustrated in FIGS. 6a and 6b. FIGS. 6a and 6b illustrate the touch switch 70 in an open circuit and a closed circuit condition, respectively.

In FIG. 6a, the touch switch 70 includes a substrate, preferably the same substrate 22 upon which the printed display 12, the printed battery 14 and the printed conductors 16 are formed. The conductor 16 is formed on the substrate 22, however, instead of the conductor 16 forming a single, continuous strip, the conductor 16 has a discontinuity 72 therein. Therefore current is not able to conduct therethrough. The switch 70 further includes a pair of printed dielectric spacers 74 formed on the conductor 16. A top printed conductor 76 is formed over the spacers 74 and the top conductor 76 preferably has a protective cover layer 78 such as Mylar which overlies the top conductor 76. In the absence of an applied force, the top conductor 76 is spaced above the conductor 16 due to the presence of the dielectric spacers 74 and the switch 70 behaves as an open circuit. If, however, a force is applied to the top conductor 76 via, for example, pressing with a finger, the top conductor 76 deforms, for example, as illustrated in FIG. 6b, causing the top conductor 76 to contact the underlying conductor 16 across the ends of the discontinuity 72, thus bridging the gap in the conductor 16. Therefore when sufficient force is applied to the switch 70, the switch 70 behaves as a short circuit and thus selectively couples the printed battery 14 to the printed display 12.

Using the switch 70 of FIGS. 6a and 6b, a selectively activatable display system may be constructed. For example, as illustrated in FIG. 1a, instead of the printed display 12 constantly displaying the message "EAT AT JOE'S", the display system 10 can be selectively activated by pushing a portion of the display system 10 corresponding to the touch switch 70 to create a short circuit, which couples the printed battery 14 to the printed display 12. In addition, as may be desired, a plurality of such display systems 10 may be incorporated together with each containing a different type of message or image. By actuating each display in a predetermined sequence a series of messages or images can be displayed.

In addition, other types of switches, for example, electrically controllable switches may be employed in conjunction with a plurality of display systems to provide for selective sequence imaging of various pixels or display portions to generate dynamic images. Such electrically controllable switches may include, for example, thin film transistors (TFTs) or the like, however, other type switches may be employed and are contemplated as falling within the scope of the present invention. In one exemplary embodiment, a plurality of display systems such as system 10 of FIG. 1*a* is utilized, wherein each printed display 12 represents a single pixel or display portion within the entire display. Each pixel is coupled to a printed battery via an electrically controllable switch. Each switch has a control terminal coupled to a control circuit, such as a thin, surface mounted integrated circuit chip having control circuitry which dictates which pixels are activated and their activation duration, to thereby generate a dynamic image. Such a display may further include a thin, surface mounted voice chip to provide sound which may be integrated or otherwise interfaced with the control circuit to provide a dynamic image which is integrated with sound.

The display system of FIGS. 1*a* and 1*b*, as well as the other Figures, illustrate the printed display 12 being located adjacent to the printed battery 14. Since both components are printed and are substantially flat, the printed display 12 alternatively may be printed on top of the printed battery 14 to make a vertically coupled display system 80, as illustrated, for example, in FIG. 7. According to such an exemplary embodiment, the display system 80 includes a printed display 82 and a printed battery 84. The printed display 82 is substantially the same as the printed display 12. The printed display 82 of FIG. 7, however, differs from the display 12 in the manner in which it couples to the printed battery 84 due to the vertical arrangement. Because the two components 82 and 84 connect vertically, contacts 85 connect to the display electrodes down to the anode and cathode of the printed battery 84, respectively, in such a manner to remain electrically isolated from one another. Preferably, the contacts 85 will not be visible when viewing the printed display 82, however, FIG. 7 shows the contacts 85 for illustration purposes.

The printed display 82 is formed on a substrate, such as the substrate 22 discussed supra. The printed battery 84 preferably is formed on a back side of the substrate 22 opposite the printed display 82. In one embodiment, the cathode layer 86 is formed by printing directly onto the substrate 22. Alternatively, a conductive layer (contact layer) may be first formed to facilitate the coupling of the cathode layer 86 to one of the display contacts 85. An anode layer 88 then couples to the cathode layer 86 with an electrolyte layer (not shown) disposed therebetween. The anode layer 88 and the electrolyte layer preferably are patterned so that the anode layer 88 makes electrical contact to the other of the display contacts 85. In such a manner, the printed battery 84 is electrically connected to the printed display 82 via the contacts 85 while preventing the anode layer 88 and the cathode layer 86 from "shorting out."

Figure 7:
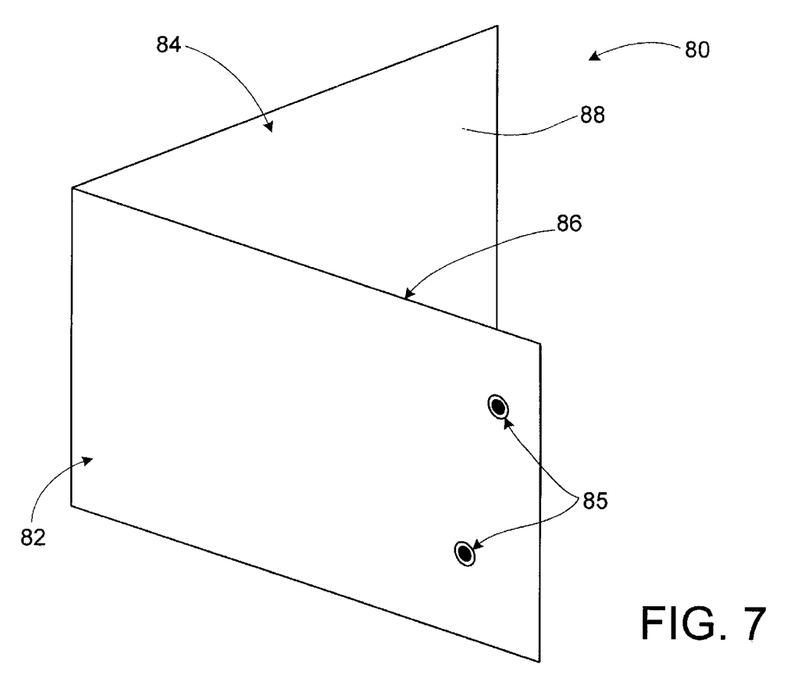
FIG. 7 is a simplified perspective view illustrating the printed display and the printed battery in a vertical arrangement according to the present invention.

As illustrated in FIG. 7, the anode layer 88 and the electrolyte layer may be formed on a back portion of the substrate 22 where the printed display 82 does not reside (laterally spaced apart, e.g., in a non-activated state) and may then be folded over as shown to activate the printed battery 84. As discussed supra, by placing a release liner (not shown) over the electrolyte layer, the anode layer 88 and the cathode layer 86 are not coupled together (in a non-activated state) and the printed battery 84 will exhibit a virtually infinite storage life. By removing the release liner and folding over the portion of the substrate 22 containing the anode layer 88, the anode layer 88 and the cathode layer 86 are coupled together via the electrolyte layer and the printed battery 84 is activated, making the vertical display system 80 operational. Although the above example discusses the formation of the electrolyte layer and release liner on the anode layer 88 in the non-activated state, the present invention also contemplates the formation of the electrolyte layer and the release liner on the cathode layer 86, as may be desired.

By forming the display system 80 in a vertical manner, multiple display systems may be spaced close together to provide a high display resolution, wherein each of the displays 82 are used as individual pixels. In yet another alternative embodiment of the present invention, multiple display systems, such as the system 10 of FIGS. 1*a* and 1*b*, are interleaved together, wherein a printed display system 10 overlaps the printed battery 14 of another system 10 to thereby effectuate a high image resolution, as may be desired.

Figure 8:
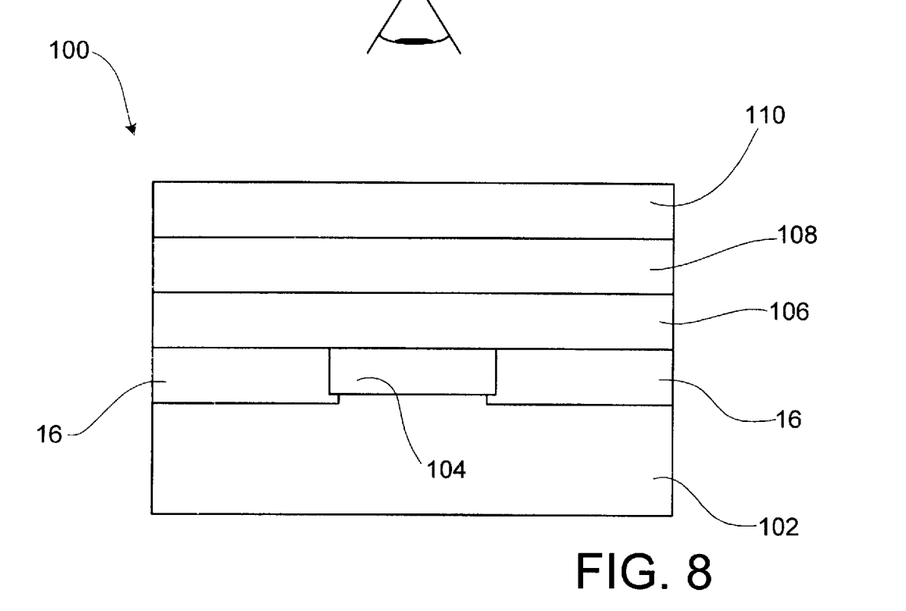
FIG. 8 is a cross section diagram illustrating a printed thermochromic display according to an exemplary embodiment of the present invention.

According to an alternative embodiment of the present invention, the display system 10 may include a printed thermochromic display as the printed display 12. An exemplary cross section view of a printed thermochromic display 100 is illustrated in FIG. 8. As is well known by those skilled in the art, a thermochromic material is a material which changes color as a temperature of the material increases over a predetermined thermal threshold. The thermochromic display 100 has a thermal insulation layer 102 which serves to prohibit heat from the display 100 from affecting an object to which the display 100 is attached, for example, the substrate 22 (not shown) on which the printed battery 14 is formed. The thermal insulation layer 102 also reduces the amount of thermal conduction therethrough which causes the heat to dissipate upwardly which results in a more efficient use of the generated heat, as will be described in greater detail below. The thermal insulation layer 102 may be a printed material which is substantially thermally insulative and any such material is contemplated as falling within the scope of the present invention. Alternatively, the insulation layer 102 may consist of an air gap which is defined, for example, by dielectric spacers (not shown) upon which the overlying layers rest.

A heat generating layer 104 is formed by printing over the thermal insulating layer 102. The heat generating layer 104 preferably is a resistive ink such as a carbon ink which acts like a resistive heater. Conductors 16 are coupled to each end of the heat generating layer 104 and are formed, as discussed supra, via printing. The conductors 16 preferably are a conductive ink such as a carbon/silver ink, although other conductive materials may be used. When a voltage potential, for example, from the printed battery 14, is applied across the heat generating layer 104, current conducts therethrough which causes the material to dissipate heat, thus "generating heat" in the display 100.

A passive light color layer 106 is formed over the heat generating layer 104 according to an exemplary embodiment of the present invention, and serves to provide the color to which the display 100 changes when a "temperature event" occurs (that is, when the heat in the display 100 reaches or exceeds the thermal threshold value). The passive light color layer 106 preferably consists of an ink layer having a color which provides good optical contrast with respect to the color of the overlying thermochromic layer when no temperature event has occurred. The passive light color layer 106 is optional and its use depends upon the nature of the thermochromic layer, as will be discussed in greater detail below. For example, if the thermochromic layer exhibits two colors having sufficient optical contrast, no such layer 106 is necessary. If, however, the thermochromic material is such that it changes from one color to a transparent state, the passive light color layer 106 provides the necessary color when the thermochromic material becomes transparent to provide sufficient optical contrast.

A thermochromic layer 108 overlies the passive light color layer 106. The thermochromic layer 108 preferably consists of a printed thermochromic material such as microencapsulated dye systems sold by, for example, Matsui or liquid crystal materials sold by, for example, Davis and Hallcrest. Alternatively, however, other suitable phase change substances may also be employed in the thermochromic layer and are contemplated as falling within the scope of the present invention. For example, mercury salts may be used. Silver-mercury salt changes from yellow to orange at 50° C. and copper-mercury salt changes from red to black at 70° C. These materials change color since the temperature change causes an atomic adjustment of the crystal lattice which alters the absorption spectrum of the salt.

Another optional material which may be used as the thermochromic layer 108 is a liquid crystal material which experiences a color change (e.g., from red-to-green-to-blue) over temperature due to changes in the molecular spacing of the liquid crystal which causes scattering at progressively shorter wavelengths. Lastly, refraction scattering materials may be used which are white due to scattered reflected light when the refraction indices do not match and become clear when the refractive indices do match.

A transparent protective layer 110, for example, a printed polyester film, preferably is formed over the thermochromic layer 108 and serves to protect the display 100 from the external environment.

The thermochromic display operates as follows. When a voltage potential is applied across the heat generating layer 104 (e.g., the resistive heater), the current through the layer 104 causes the temperature of the display 100 to increase from an ambient temperature to an elevated temperature. When the temperature reaches or exceeds a predetermined threshold determined by the thermochromic material in the thermochromic layer 108, the thermochromic layer 108 becomes optically responsive to the heat and changes from the first state (e.g., an opaque black) to the second state (e.g., transparent) to thus reveal the color of the underlying passive light color layer 106. The display 100 of FIG. 8 may be employed as an entire display or as an individual pixel or display portion, as may be desired.

According to an alternative embodiment of the present invention, the thermochromic display may have multiple thermochromic layers to provide multiple, differing colors at different thermal thresholds, as may be desired. Additional information regarding thermochromic displays may be found in U.S. Pat. No. 5,557,208 which is hereby incorporated by reference in its entirety.

The necessary load current in the heat generating layer 104 of the thermochromic display 100 can be determined as follows. The watt density can be determined by the voltage relationship:

$$W=V^2/\rho L^2,$$

wherein V is the applied voltage across the heat generating layer 104, L is the length of the heat generating current path, and ρ is the sheet resistivity of the heat generating layer. Assuming that L is 0.1", V=1.2V and W=1.5 W/in.$^2$, ρ is determined as follows: $\rho=(1.2V)^2/(0.1")^2(1.5$ W/in.$)=100$ Ω/square. Assuming L=W=0.1" (a square display element or pixel), the load current I can be determined via Ohm's law:

$$I=V/R=1.2V/100 \ \Omega=12 \text{ mA}.$$

Thus the printed battery 14 must be able to supply 12 mA of load current to heat 0.1"×0.1" square of material to 1.5 W. This amount of power dissipation would result in a heating of about 20–30° C. above ambient temperature. Therefore if the thermochromic material used in the thermochromic layer 108 has a thermal threshold of about 37° C. at which temperature the material changes from black to clear, the printed display 100 will properly operate as a display or an individual pixel within a larger display environment.

The discussion supra with regard to the selective control of the display via switches is equally applicable to the thermochromic display. In addition, the display 100 may be fabricated adjacent to or on top of the printed battery 14, as may be desired. All of the features discussed above in conjunction with the electrochromic display are also contemplated for use with a thermochromic display.

Figure 9:
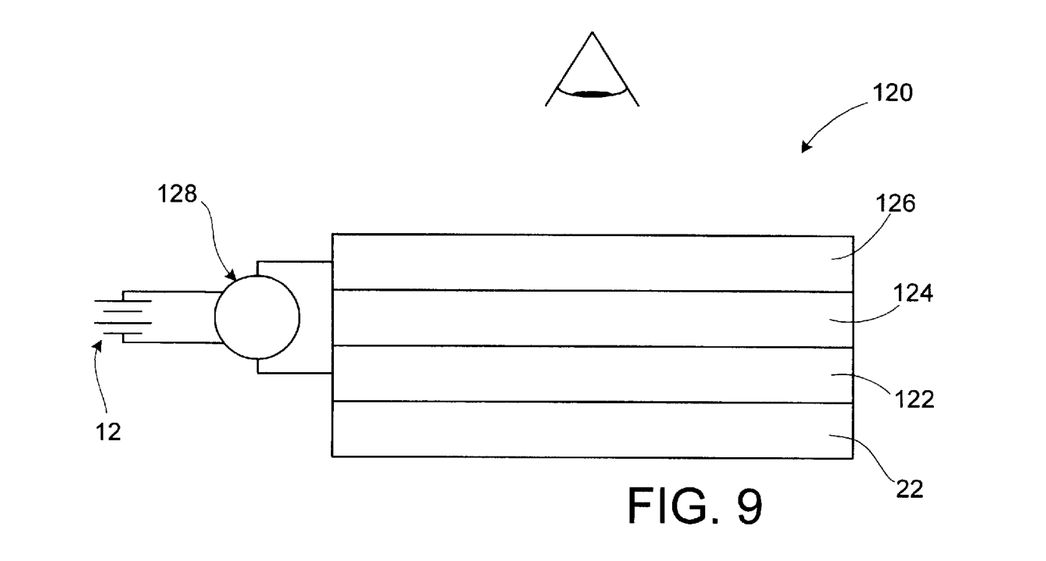
FIG. 9 is a cross section diagram illustrating a printed electroluminescent display according to an exemplary embodiment of the present invention.

According to another alternative embodiment of the present invention, the printed display 12 may include a printed electroluminescent display 120, as illustrated in FIG. 9. The electroluminescent display 120 has a substrate, for example, the substrate 22 upon which the printed battery is fabricated. An electrode layer 122 is formed on the substrate 22 by printing and may be, for example, a carbon/silver ink. An electroluminescent layer 124 is then formed thereon by printing. According to a preferred embodiment of the present invention, the electroluminescent layer 124 is composed of glass encapsulated phosphors such as those sold by Acheson Ink in an ink carrier. Alternatively, phosphor crystals may be embedded in a polymer binder. Lastly, a transparent electrode layer 126 is formed by printing over the electroluminescent layer 124. Preferably, the electrode layer is a transparent indium tin oxide (ITO) material although other transparent conductive materials may be used and are contemplated as falling within the scope of the present invention.

The electroluminescent display 120 operates in the following manner. When a dynamic voltage is applied across the electrodes 122 and 126 (e.g., an AC type voltage or a pulsed DC type voltage), an electric field is generated across the electroluminescent layer 124. The field causes light to be emitted from the layer 124, the color of which is a function of the types of phosphors within the electroluminescent layer 124.

The dynamic voltage needed to drive the display 120 can not be provided merely by DC printed battery 14 of the present invention. Consequently, the display system requires a conversion circuit 128 which is powered by the printed battery 14 to drive the display 120. The conversion circuit 128 is preferably a boost regulator type circuit which supplied a dynamic output voltage, for example, about 80–90 volts at about 300–400 Hz. An exemplary boost regulator circuit uses a power MOS transistor to switch an inductive load, the stored energy in which is transferred to the display 120 which is connected across an H-bridge type circuit. By controlling the H-bridge transistors, the load (display 120) is driven bi-directionally at a frequency which is dictated by the H-bridge control sequence. Alternatively, other control circuits may be used as the conversion circuit 128 and such alternative circuits are contemplated as failing within the scope of the present invention. For additional information on such conversion circuits, please see U.S. Pat. Nos. 4,527,096 and 5,821,701 which are hereby incorporated by reference in their entirety.

The discussion supra with regard to the selective control of the display via switches is equally applicable to the electroluminescent display. In addition, the display 120 may be fabricated adjacent to or on top of the printed battery 14, as may be desired. All of the features discussed above in conjunction with the electrochromic and thermochromic displays are also contemplated for use with an electroluminescent display.

Figure 10:
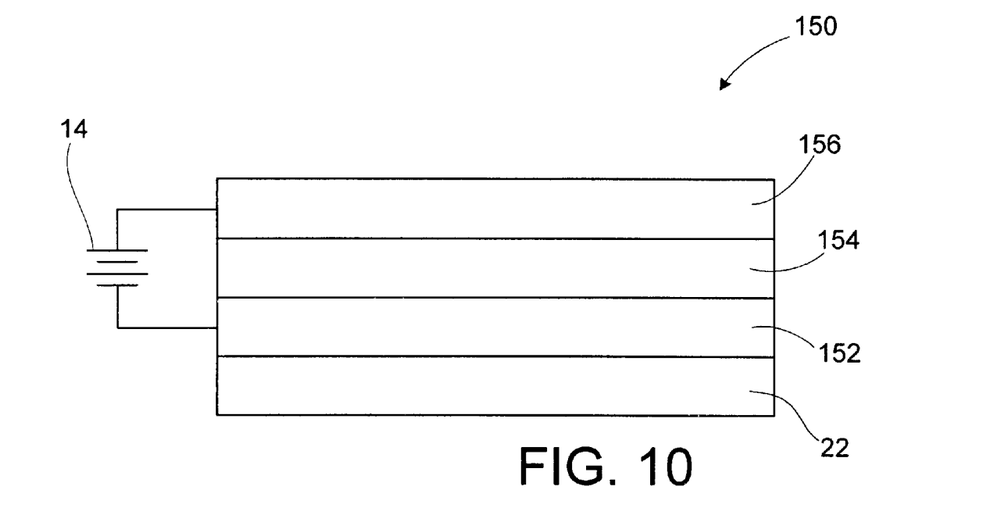
FIG. 10 is a cross section diagram illustrating a printed electrophoretic display according to an exemplary embodiment of the present invention.

According to still another embodiment of the present invention, a printed electrophoretic display 150 may be used as the printed display 12 in the display system 10. The electrophorectic display 150 has a substrate, for example, the substrate 22 upon which the printed battery 14 is fabricated. An electrode layer 152 is formed on the substrate 22 by printing and may be, for example, a carbon/silver ink. An electrophoretic layer 154 is then formed thereon by printing. According to a preferred embodiment of the present invention, the electrophoretic layer 154 is composed of, for example, an electronic ink. The electronic ink includes micro-encapsulated particles within an ink carrier. Microscopic, spherical particles are enclosed within transparent capsules in the ink carrier and have a first color (e.g., black) which is positively charged on one side, and a second color (e.g., white) which is negatively charged on the other side. Lastly, a transparent electrode layer 156 is formed by printing over the electrophoretic layer 154. Preferably, the electrode layer is a transparent indium tin oxide (ITO) material although other transparent conductive materials may be used and are contemplated as falling within the scope of the present invention.

The electronic ink operates in the following manner. By applying a voltage potential to the electrodes 152 and 156 via the printed battery 14, an electric field develops across the electrophoretic layer 154 which rotates the charged particles within the transparent capsules to one side (e.g., the black side) which stick to the top of the respective capsules. By reversing the applied voltage, the electric field direction is reversed, which rotates the charged particles to the other side (e.g., the white side) which stick to the bottom of the respective capsules. Since the particles stick to the top and bottom portions of the capsules after the electric field is applied, no additional power is needed to maintain the particles in position, thus the power needed to form and maintain an image is advantageously low.

As can be seen from the above description, by altering the polarity of an applied voltage to the printed display, the color of the electrophoretic layer will change with only a small amount of power consumption. To achieve a switching of the voltage polarity, the conductors 16 which couple the printed display 150 to the printed battery 14 are preferably cross coupled with touch switches or electrically controllable switches therebetween to effectuate the changing of the polarity to the printed display. As is evident, the printed display 150 may be incorporated with a plurality of similar displays with each display 150 forming a single pixel or a display portion.

In another alternative embodiment of the present invention, the electrophoretic layer 154 may be composed of other materials. For example, any suspension of charged pigment particles contained in a fluid or ink carrier is contemplated as falling within the scope of the present invention. In such a case, when a voltage is applied to the display 150 with a first polarity, the electric field exerts a force on the pigment particles which pass against the transparent electrode 156, thus producing the color of the pigment. When a voltage with the opposite polarity is applied across the electrodes 152 and 156, the pigment particles are packed against the bottom electrode 152 and ambient room light is absorbed and scattered by the dyed ink carrier fluid and the color of the dye is observed. In such cases, it is preferred that the particles are light with large scattering coefficients, for example, titanium dioxide, in a dark-dyed medium. Of course, other alternative material configurations may be employed and are contemplated as falling within the scope of the present invention. For additional information regarding electrophorectic displays, see U.S. Pat. No. 5,872,552, which is hereby incorporated by reference in its entirety.

The discussion supra with regard to the selective control of the display via switches is equally applicable to the electrophoretic display. In addition, the display 150 may be fabricated adjacent to or on top of the printed battery 14, as may be desired. All of the features discussed above in conjunction with the electrochromic, thermochromic and electroluminescent displays are also contemplated for use with an electrophoretic display.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A display system, comprising:

a printed display formed on a substrate; and a printed battery in electrical communication with the printed display, wherein the printed battery includes a non-activated state and an activated state, wherein the non-activated state allows the printed battery to be stored substantially indefinitely without loss of stored charge and in the activated state the printed battery provides power to the printed display, and wherein the non-activated state of the printed battery comprises a separation layer interposed between an anode layer and a cathode layer, wherein the separation layer is selectively removable, thus allowing the anode layer to couple to the cathode layer via an electrolyte layer, thereby placing the printed battery in the activated state.

2. The display system of claim 1, wherein the printed display is one of an electrochromic display, a thermochromic display, an electroluminescent display, or an electrophoretic display.

3. The display system of claim 1, wherein the printed battery comprises:

an anode layer which includes an ink carrier having $MnO_2$ particulates therein;

a cathode layer which includes an ink carrier having zinc particulates therein; and an electrolyte layer disposed between the anode and cathode layers.

4. The display system of claim 3, wherein the printed battery is printed on the substrate.

5. The display system of claim 1, further comprising printed conductive strips coupled between the printed display and the printed battery for effectuating the electrical communication therebetween.

6. The display system of claim 5, further comprising a switch disposed within one or more of the conductive strips, wherein the switch provides a selective coupling of the printed display to the printed battery.

7. The display system of claim 6, wherein the switch is a printed touch switch which is activated via application of a force thereto.

8. The display system of claim 5, wherein the conductive strips comprise printed conductive ink strips.

9. The display system of claim 8, wherein the conductive ink strips include a carbon or a carbon silver ink.

10. The display system of claim 1, wherein the separation layer comprises a release liner.

11. The display system of claim 3, wherein the printed battery comprises:

the anode layer formed over a substrate;

the cathode layer formed over the substrate, wherein the cathode layer is disposed laterally and spaced apart from the anode layer on the substrate; and the electrolyte layer formed over anode layer or the cathode layer, wherein the printed battery is in an non-activated state for storage and experiences negligible charge leakage, and wherein the substrate is flexible and when folded in a manner to couple the anode layer to the cathode layer with the electrolyte layer therebetween, the printed battery is in an activated state and is operable to provide power to the printed display.

12. The display system of claim 11, further comprising a release liner over the electrolyte layer to protect the electrolyte layer in the non-activated state.

13. The display system of claim 1, further comprising a plurality of printed batteries and a plurality of associated printed displays in electrical communication therewith, wherein each of the displays forms a pixel in the display system.

14. The display system of claim 13, wherein each printed battery and associated printed display form a pixel pair, and wherein the pixel pairs overlap one another such that a printed display portion of one pixel pair overlaps printed battery portion of another pixel, thereby allowing the printed display portions of the pixel pairs to be spaced closely together and providing a high system display resolution.

15. The display system of claim 2, wherein the electrochromic display comprises:

a first printed electrode layer;

a printed electrolyte layer formed over the first electrode layer;

a printed electrochromic layer formed over the electrolyte layer; and a second printed electrode layer formed over the electrochromic layer, wherein a voltage potential applied across the first and second electrode layers causes an interface between the electrolyte layer and the electrochromic layer to be electrochromically activated, thereby altering a color of the electrochromic layer at the interface.

16. The display system of claim 2, wherein the electrochromic display comprises:

a printed electrode layer composed of first and second electrode regions, wherein the first and second electrode regions are interdigitated;

a printed electrochromic layer formed over the electrode layer; and a printed electrolyte layer formed over the electrochromic layer, wherein a voltage potential applied across the first and second electrode regions causes an interface between the electrolyte layer and the electrochromic layer to be electrochromically activated, thereby altering a color of the electrochromic layer at the interface.

17. The display system of claim 2, wherein the thermochromic display comprises:

a printed, selectively activatable heat generating layer; and a printed thermochromic layer formed over the heat generating layer, wherein when the heat generating layer is activated, a temperature of the heat generating layer increases and causes the thermochromic layer to change color.

18. The display system of claim 17, wherein the heat generating layer comprises a printed resistive ink, wherein when a voltage potential is applied across the heat generating layer, a current conducts through the printed resistive ink, thus dissipating heat and increasing the temperature in the heat generating layer.

19. The display system of claim 18, wherein the printed resistive ink comprises a carbon ink.

20. The display system of claim 17, further comprising a printed passive color layer disposed between the heat generating layer and the thermochromic layer, wherein when the heat generating layer is activated, the thermochromic layer changes color to a substantially transparent state and exposes a color associated with the passive color layer.

21. The display system of claim 18, further comprising a printed contact layer composed of conductive ink, wherein the printed contact layer provides electrical contact between the heat generating layer and the printed battery.

22. The display of claim 21, wherein the conductive ink comprises silver ink.

23. The display system of claim 21, wherein the printed electroluminescent display further comprises:

a first printed electrode layer;

a printed electroluminescent layer containing phosphors therein formed over the first printed electrode layer;

a second printed electrode layer formed over the electroluminescent layer, wherein one of the first and second electrode layers is formed of a transparent conductive material; and a converter circuit coupled between the printed battery and the electrode layers, wherein the converter circuit provides a dynamic voltage across the first and second electrode layers to thereby cause the phosphors within the electroluminescent layer to emit light.

24. The display system of claim 23, wherein the electroluminescent layer comprises a plurality of glass encapsulated phosphors within an ink carrier.

25. The display system of claim 23, wherein the electroluminescent layer comprises a plurality of phosphor crystals embedded within a polymer binder.

26. The display system of claim 23, wherein the transparent conductor material comprises indium tin oxide (ITO).

27. The display system of claim 23, wherein the converter circuit comprises a boost regulator circuit for driving the electroluminescent display bi-directionally.

28. The display system of claim 2, wherein the electrophoretic display further comprises:

a printed first electrode layer;

a printed electrophoretic layer formed over the first electrode layer; and a printed second electrode layer formed over the electrophoretic layer, wherein one of the first and second electrode layers is composed of a transparent conductive material, and wherein the first and second electrode layers are coupled to the printed battery, wherein when a voltage is applied across the first and second electrode layers, an electric field having a direction influences the electrophoretic layer to generate a first color, and when the voltage applied across the electrode layers is reversed, the electric field direction is reversed and influences the electrophoretic layer to generate a second color.

29. The display system of claim 28, wherein the electrophoretic layer comprises electronic ink.

30. The display system of claim 29, wherein the electronic ink comprises a plurality of transparent capsules within an ink carrier, wherein a charged particle resides within the transparent capsules, and wherein the charged particles have a positive charge on one side which is a first color and have a negative charge on another side which is a second color, and further wherein the direction of the electric field influences the charged particles within the transparent capsules to selectively generate the first and second colors.

31. The display system of claim 28, wherein the electrophoretic display comprises a suspension of charged pigment particles in a fluid or ink carrier, wherein the electric field direction influences the charged pigment particles to provide different colors based on the direction of the electric field.

32. The display system of claim 28, further comprises cross-coupled conductive switches coupled between the electrode layers of the electrophoretic display and the printed battery, wherein the conductive switches are operable to be actuated to reverse a voltage supplied by the battery to the first and second electrode layers of the electrophoretic display.

33. The display system of claim 1, wherein the printed display is printed over the printed battery, thereby forming a vertically coupled display system.

34. The display system of claim 33, wherein the printed display is formed on one side of a flexible substrate and the printed battery is formed on the other side of the substrate, and wherein the printed battery and the printed display are electrically coupled together through contact openings in the substrate.

35. The display system of claim 34, wherein the printed battery comprises:

an anode portion and a cathode portion formed on the substrate and laterally spaced apart from one another; and a printed electrolyte layer formed on the anode portion or the cathode portion;

wherein the printed battery is in a non-activated state, and wherein when the substrate is folded, the anode portion and the cathode portion are coupled together via the electrolyte layer to place the printed battery in an activated state.

36. The display system of claim 1, wherein the printed display and printed battery are printed at the same time.

37. A display system, comprising:

a printed display formed on a substrate; and a printed battery in electrical communication with the printed display, wherein the printed display and printed battery are printed at the same time, wherein the printed battery includes a non-activated state and an activated state, wherein the non-activated state allows the printed battery to be stored substantially indefinitely without loss of stored charge and in the activated state the printed battery provides power to the printed display, and wherein the non-activated state of the printed battery comprises a separation layer interposed between an anode layer and a cathode layer, wherein the separation layer is selectively removable, thus allowing the anode layer to couple to the cathode layer via an electrolyte layer, thereby placing the printed battery in the activated state.

38. The display system of claim 37, further comprising a switch disposed within one or more conductive strips coupled between the printed display and the printed battery for effectuating electrical communication therebetween, wherein the switch is printed at the same time as the printed display and printed battery and provides a selective coupling of the printed display to the printed battery.

39. A method of producing a display system, comprising the steps of:

printing a display on a substrate; and printing a battery in electrical communication with the display, wherein the display and battery are printed at the same time, and wherein the printed battery includes a non-activated state and an activated state, wherein the non-activated state allows the printed battery to be stored substantially indefinitely without loss of stored charge and in the activated state the battery provides power to the display, and wherein the non-activated state of the printed battery comprises a separation layer interposed between an anode layer and a cathode layer, wherein the separation layer is selectively removable, thus allowing the anode layer to couple to the cathode layer via an electrolyte layer, thereby placing the printed battery in the activated state.

40. The method according to claim 39, further including the step of:

printing a switch disposed within one or more conductive strips coupled between the display and the battery for effectuating electrical communication therebetween, wherein the switch is printed at the same time as the display and battery and provides a selective coupling of the display to the battery.

41. A method of producing a display system, comprising the steps of:

printing a display on a substrate; and printing a battery in electrical communication with the display, wherein the battery includes a non-activated state and an activated state, wherein the non-activated state allows the battery to be stored substantially indefinitely without loss of stored charge and in the activated state the battery provides power to the display, and wherein the non-activated state of the printed battery comprises a separation layer interposed between an anode layer and a cathode layer, wherein the separation layer is selectively removable, thus allowing the anode layer to couple to the cathode layer via an electrolyte layer, thereby placing the printed battery in the activated state.

42. The method according to claim 41, further including the step of:

printing a switch disposed within one or more conductive strips coupled between the display and the battery for effectuating electrical communication therebetween, wherein the switch is printed at the same time as the display and battery and provides a selective coupling of the display to the battery.

43. A display system, comprising:

a printed display formed on a substrate; and a printed battery in electrical communication with the printed display, wherein the printed battery comprises;

an anode layer formed over the substrate;

a cathode layer formed over the substrate, wherein the cathode layer is disposed laterally and spaced apart from the anode layer on the substrate; and an electrolyte layer formed over the anode layer or the cathode layer, wherein the printed battery is in a non-activated state for storage and experiences negligible charge leakage, and wherein the substrate is flexible and when folded in a manner to couple the anode layer to the cathode layer with the electrolyte layer therebetween, the printed battery is in an activated state and is operable to provide power to the printed display.

44. The display system of claim 43, further comprising a release liner over the electrolyte layer to protect the electrolyte layer in the non-activated state.

45. A display system, comprising:

a printed display formed on a substrate; and a printed battery in electrical communication with the printed display, wherein the printed battery includes a non-activated state and an activated state, wherein the non-activated state allows the printed battery to be stored substantially indefinitely without loss of stored charge and in the activated state the printed battery provides power to the printed display, and wherein the printed display is formed on one side of a flexible substrate and the printed battery is formed on the other side of the substrate, and wherein the printed battery and the printed display are electrically coupled together through con tact openings in the substrate.

\* \* \* \* \*